US012304392B2

(12) United States Patent
Tsuda (10) Patent No.: US 12,304,392 B2
(45) Date of Patent: May 20, 2025

(54) VEHICLE REARWARD MONITORING SYSTEM AND VEHICLE REARWARD MONITORING METHOD (71) Applicant: Isuzu Motors Limited, Yokohama (JP)

(72) Inventor: Ryuta Tsuda, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 69 days.

(21) Appl. No.: 18/124,628

(22) Filed: Mar. 22, 2023

(65) Prior Publication Data

US 2023/0303000 A1 Sep. 28, 2023

(30) Foreign Application Priority Data

Mar. 23, 2022 (JP) .................. 2022-046660

(51) Int. Cl.
*G06V 10/80* (2022.01)
*B60R 1/26* (2022.01)
*G06V 20/58* (2022.01)

(52) U.S. Cl.
CPC ............... *B60R 1/26* (2022.01); *G06V 20/58* (2022.01); *B60R 2300/105* (2013.01); *B60R 2300/607* (2013.01); *B60R 2300/8093* (2013.01)

(58) Field of Classification Search
CPC ............... B60R 1/26; B60R 2300/105; B60R 2300/607; B60R 2300/8093; B60R 2300/8066; G06V 20/58; G06V 10/811; B60W 30/0956

USPC ......................................................... 348/148
See application file for complete search history.

(56) References Cited

FOREIGN PATENT DOCUMENTS

| JP | 2009188635 A | * | 8/2009 |
|----|--------------|---|--------|
| JP | 2013239015 A | * | 11/2013 |
| JP | 2022-016027 | | 1/2022 |
| JP | 2022-023870 | | 2/2022 |

* cited by examiner

*Primary Examiner* — Stuart D Bennett
*Assistant Examiner* — Mahmoud Kamal Abouzahra (57) ABSTRACT A vehicle rearward monitoring system includes: a lower camera that captures a road surface behind the truck; an upper camera disposed above the lower camera in the truck to capture the road surface behind the truck; a conversion unit that converts lower and upper camera images G1 and G2 captured by the lower and upper cameras into lower and upper bird's-eye views T1 and T2; an object detection unit that compares upper and lower bird's-eye views T2 and T1 to detect the object on the road surface from a difference of a corrected portion hidden by the object on the road surface in upper and lower camera images G2 and G1; and a collision possibility determination unit that makes a driver of the truck recognize a possibility of collision when there is a possibility of collision with the object detected by the object detection unit with the truck.

6 Claims, 6 Drawing Sheets

VEHICLE REARWARD MONITORING SYSTEM AND VEHICLE REARWARD MONITORING METHOD

CROSS REFERENCE TO RELATED APPLICATIONS

This application claims the benefit of priority of Japanese Patent Application No. 2022-046660, filed on Mar. 23, 2022, the contents of which are incorporated by reference as if fully set forth herein in their entirety.

TECHNICAL FIELD

The present disclosure relates to a vehicle rearward monitoring system and a vehicle rearward monitoring method.

BACKGROUND ART

Some vehicles are provided with a detection unit for detecting objects around the vehicle for the purpose of preventing collision. As the detection unit, ultrasound sensors of a type called sonar sensor or clearance sonar are known (PTL 1). In addition, a technique in which a camera is provided as the detection unit and objects are extracted through machine learning from the image captured by the camera is known (PTL 2).

CITATION LIST

Patent Literature

PTL 1
Japanese Patent Application Laid-Open No. 2022-23870
PTL 2
Japanese Patent Application Laid-Open No. 2022-16027

SUMMARY OF INVENTION

Technical Problem

Here, to detect objects behind a cargo vehicle, it is necessary to mount the detection unit on the loading body, which is the cargo bed. However, the shape and dimension of the loading body of the cargo vehicle widely vary depending on the application. Therefore, in the case where the clearance sonar disclosed in PTL 1 is attached, the optimum position varies depending on the loading body. In addition, the loading body includes various parts such as protruding parts and movable parts, and if ultrasound emitted from the clearance sonar hits such parts, the loading body may possibly be erroneously detected as an object around the vehicle. As such, in some cases it is difficult to provide the clearance sonar to the cargo vehicle in terms of the problems with the attachment position and the detection errors.

In addition, the method of extracting objects through machine learning as disclosed in PTL 2 requires enormous amount of data for the machine learning, and man hours and cost for the learning of the data. In addition, the installation height of the camera of the cargo vehicle widely varies depending on the loading body, and cannot be set to a specific height, and consequently, the appearance of an object varies depending on the installation height. As such, highly accurate machine learning may not possibly be achieved.

To solve the above-described problems, an object of the present disclosure is to provide a vehicle rearward monitoring system that can easily determine the possibility of collision of the vehicle with objects behind the vehicle from the image captured by the camera.

Solution to Problem

To achieve the above-mentioned object, a vehicle rearward monitoring system according to one aspect of the present disclosure is configured to monitor an object behind the vehicle, the vehicle rearward monitoring system including: a lower camera provided in the vehicle and configured to capture an image of a road surface behind the vehicle; an upper camera disposed above the lower camera in the vehicle and configured to capture the image of the road surface behind the vehicle; a conversion unit configured to convert a lower camera image into a lower bird's-eye view and convert an upper camera image into an upper bird's-eye view, the lower camera image being the image of the road surface captured by the lower camera, the lower bird's-eye view being a plan view of the road surface as viewed from above, the upper camera image being the image of the road surface captured by the upper camera, the upper bird's-eye view being a plan view of the road surface as viewed from above; an object detection unit configured compare the upper bird's-eye view and the lower bird's-eye view and detect the object on the road surface from a difference of an unshown portion that is hidden by the object located on the road surface in the upper camera image and the lower camera image; and a collision possibility determination unit configured to determine a possibility of collision of the vehicle with the object detected by the object detection unit and make a driver of the vehicle recognize a possibility of collision when it is determined that there is a possibility of collision.

A vehicle rearward monitoring method according to another aspect of the present disclosure is a method for monitoring an object behind the vehicle, the vehicle rearward monitoring method including: capturing an image of a road surface behind the vehicle with a lower camera provided in the vehicle and an upper camera disposed above the lower camera in the vehicle; converting a lower camera image into a lower bird's-eye view and converting an upper camera image into an upper bird's-eye view, the lower camera image being the image of the road surface captured by the lower camera, the lower bird's-eye view being a plan view of the road surface as viewed from above, the upper camera image being the image of the road surface captured by the upper camera, the upper bird's-eye view being a plan view of the road surface as viewed from above; comparing the upper bird's-eye view and the lower bird's-eye view and detecting the object on the road surface from a difference of an unshown portion that is hidden by the object located on the road surface in the upper camera image and the lower camera image; and determining a possibility of collision of the vehicle with the object detected by the comparing and detecting and making a driver of the vehicle recognize a possibility of collision when it is determined that there is a possibility of collision.

Advantageous Effects of Invention

According to the present disclosure, it is possible to provide a vehicle rearward monitoring system that can easily determine the possibility of collision of the vehicle with objects behind the vehicle from the image captured by the camera.

BRIEF DESCRIPTION OF DRAWINGS

FIGS. 3A and 3B are diagrams for describing a procedure of detecting an object behind a cargo vehicle with the rearward monitoring system.

DESCRIPTION OF EMBODIMENTS

Preferred embodiments of the present disclosure are elaborated below with reference to the accompanying drawings. Here, as rearward monitoring system 1, the following describes an example of a system for detecting an object on road surface 109 behind cargo bed 107 of truck 100, which is a vehicle provided with cargo bed 107 of a van-body type. In addition, in the following drawings, the X direction is the front-rear direction of truck 100, the Y direction is the vehicle width direction of truck 100, and the Z direction is the vertical direction.

Figure 1:
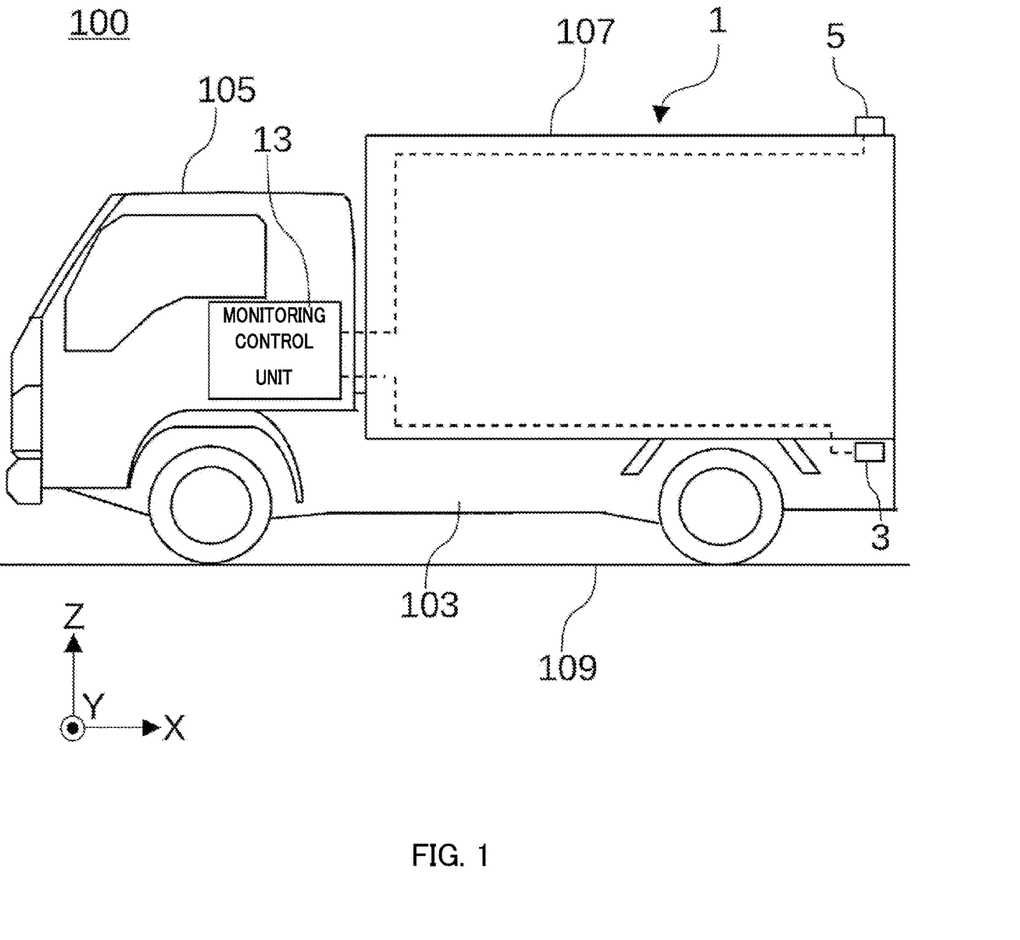
FIG. 1 is a side view of a cargo vehicle including a rearward monitoring system according to an embodiment of the present disclosure.

First, with reference to FIG. 1, an overview of the structure of truck 100 is described. Truck 100 illustrated in FIG. 1 includes chassis 103, which is a structure for supporting the apparatuses making up truck 100, cab 105, which is a cab provided at the front end of chassis 103, cargo bed 107 provided at chassis 103 on the rear side of cab 105, and rearward monitoring system 1.

Figure 2:
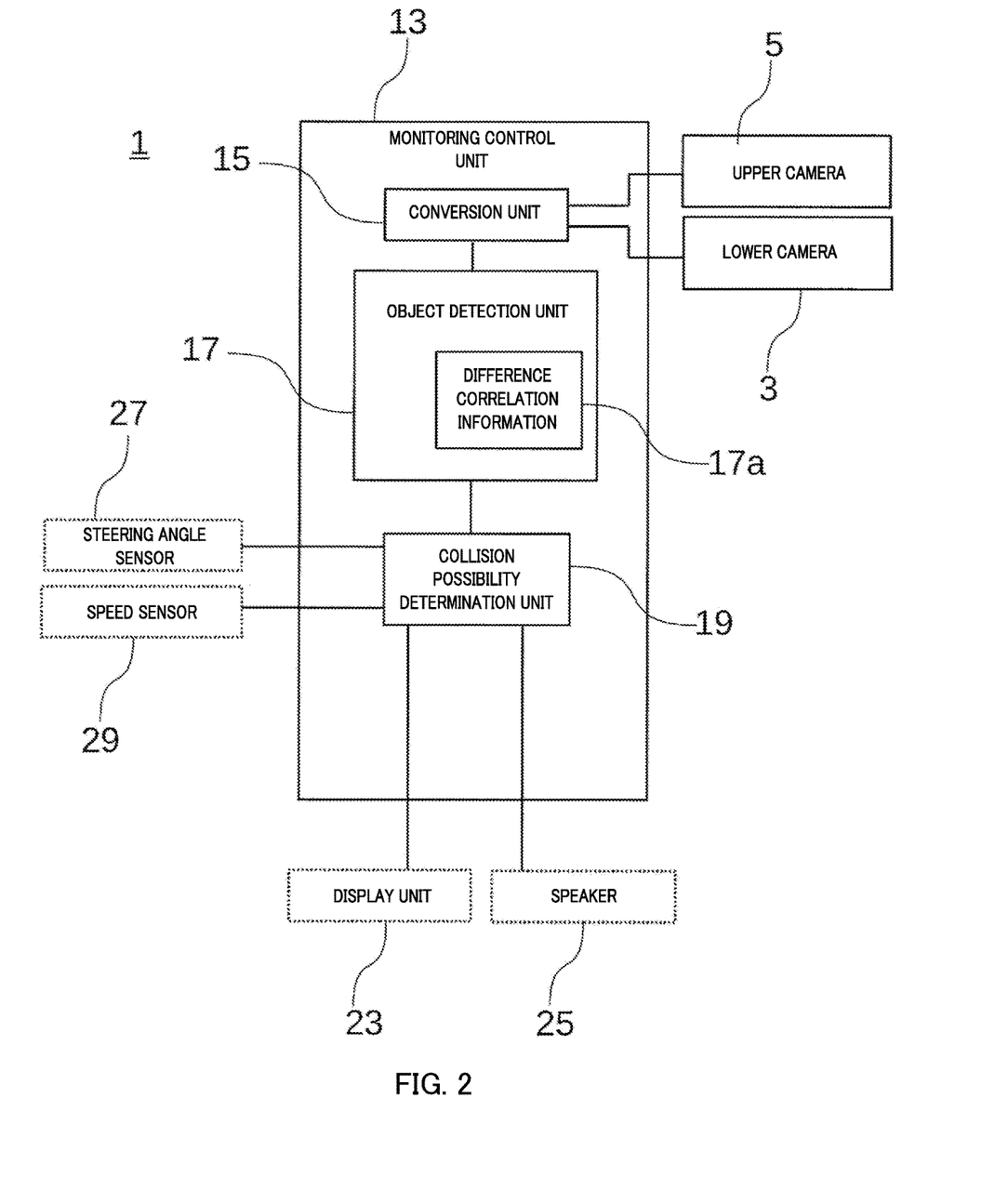
FIG. 2 is a functional block diagram of the rearward monitoring system.

Next, with reference to FIGS. 1 to 5, a structure of rearward monitoring system 1 is described in detail. Rearward monitoring system 1 is a system for detecting an object on road surface 109 behind cargo bed 107, and making the driver of truck 100 recognize the possibility of collision when there is a possibility of collision between the detected object and truck 100. As illustrated in FIGS. 1 and 2, rearward monitoring system 1 includes lower camera 3, upper camera 5, and monitoring control unit 13.

Lower camera 3 is, for example, a monocular camera that is provided in truck 100, and captures an image of road surface 109 behind cargo bed 107 of truck 100. The specific structures of the camera may be the same as those of publicly known monocular cameras. In addition, it suffices that the light source for lower camera 3 to capture an image of road surface 109 is lights, such as tail lights not illustrated in the drawing, installed at the rear end of truck 100, but cameras, such as infrared ray cameras, that do not require the light source may also be used.

Preferably, the specific installation position of lower camera 3 in the front-rear direction is the rear end of truck 100 in order to easily capture the image of the rear side of truck 100. In the case where the installation position of lower camera 3 in the vehicle width direction is at the center of the vehicle width direction, the left and right regions with the same length in the vehicle width direction can be captured, which is preferable. Regarding the installation position of lower camera 3 in the height direction, it is provided at a position, on the lower side as much as possible, where objects behind the vehicle can be captured. It should be noted that if the installation position is excessively low, lower camera 3 may possibly make contact with road surface 109, and therefore it is set in the range where it does not make contact with road surface 109. More specifically, preferably, it is provided at the rear end of chassis 103 as illustrated in FIG. 1.

Figure 3A:
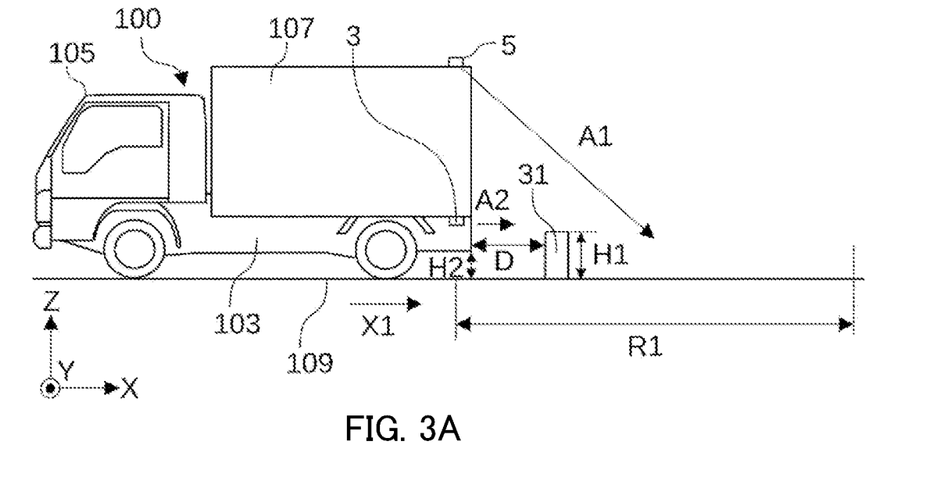
FIG. 3A is a side view and FIG. 3B is a plan view of FIG. 3A.
Figure 3B:
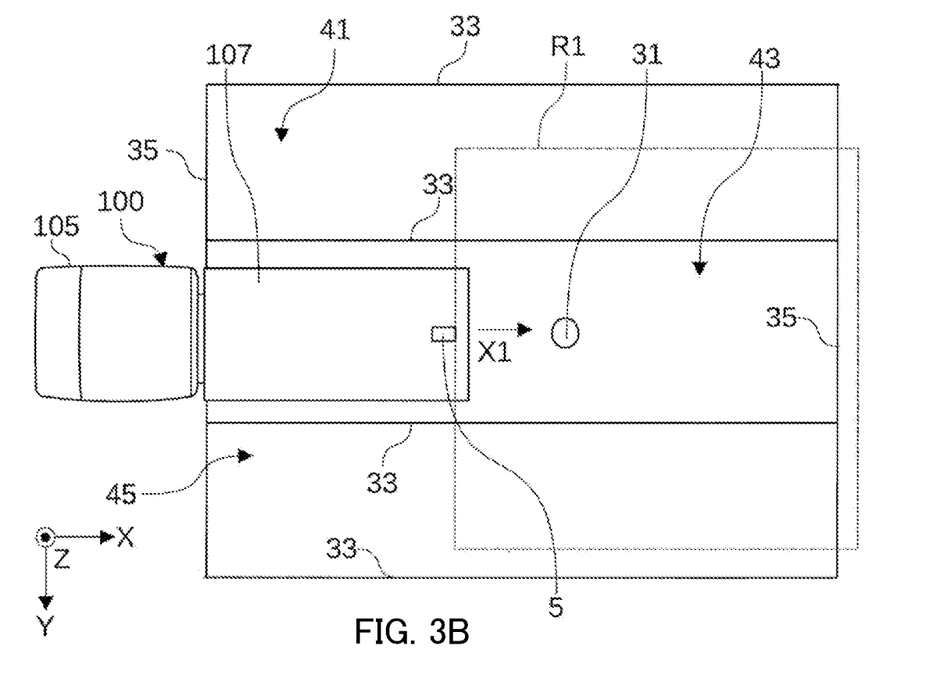

The capturing range of lower camera 3 includes road surface 109 behind truck 100 as with capturing range R1 illustrated in FIGS. 3A and 3B. The field angle and optical axis A2 of lower camera 3 are set such that the capturing range R1 can be captured. Note that since lower camera 3 is provided near road surface 109, optical axis A2 may be horizontal. It should be noted that regarding lower camera 3, it is preferable that the rear end of cargo bed 107 falls inside the capturing range R1. The reason for this is that the distance between the detected object and the rear end of cargo bed 107 in the captured image can be easily determined.

Figure 4A:
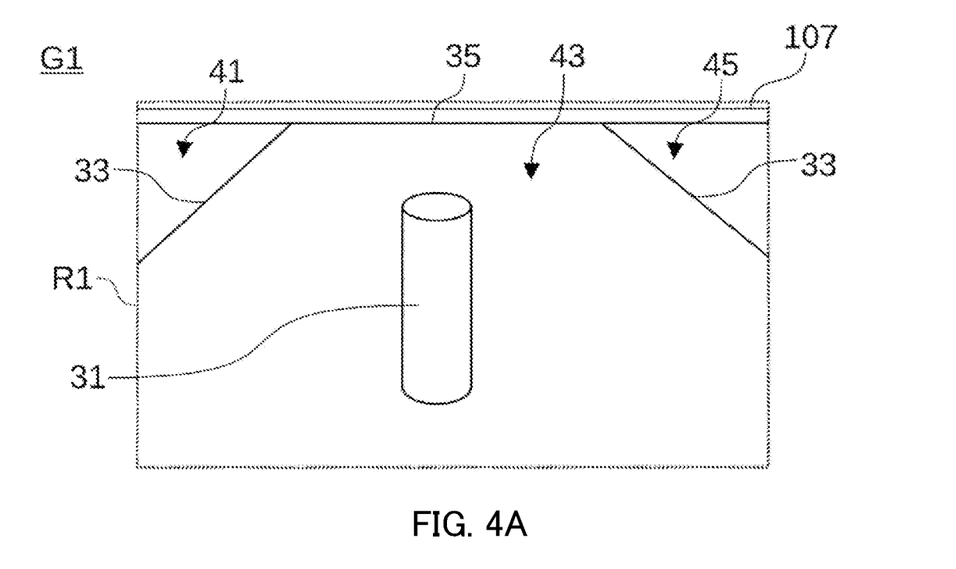
FIG. 4A is a schematic view of a lower camera image, which is an image of a rear side of the vehicle captured with a lower camera.

For example, as illustrated in FIG. 3B, it is assumed that truck 100 is moving backward in the X1 direction in order to park in parking region 43 of parking regions 41, 43 and 45 surrounded by white lines 33 and 35. In addition, it is assumed that pillar 31 with height H1 such as a traffic cone is set in parking region 43, making the region temporarily non-parkable. In this case, lower camera image G1, which is an image captured by lower camera 3, is schematically illustrated as in FIG. 4A. As illustrated in FIG. 4A, lower camera image G1 captured by lower camera 3 shows at least the rear end of cargo bed 107, white lines 33 and 35, and pillar 31. It should be noted that in lower camera image G1, the rear portion of pillar 31 is hidden by pillar 31 and not shown.

Upper camera 5 illustrated in FIGS. 1 and 2 is, for example, a monocular camera disposed above lower camera 3 in truck 100 to capture road surface 109 behind truck 100. The specific structure of upper camera 5 is the same as that of lower camera 3.

Preferably, the specific installation position of upper camera 5 in the front-rear direction is the rear end of truck 100 in order to easily capture the image of the rear side of truck 100 as with lower camera 3. The installation position of upper camera 5 in the vehicle width direction is the same as that of lower camera 3. Regarding the installation position of upper camera 5 in the height direction, it is provided at a position where objects behind the vehicle can be captured, on the upper side as much as possible. The reason for this is that in the present embodiment, the images captured by lower camera 3 and upper camera 5 are converted into bird's-eye views, and the object is detected from the difference of the bird's-eye views, and as such the greater the difference in height of lower camera 3 and upper camera 5, the greater the difference of the bird's-eye views and the more the height of the object to be detected can be reduced. More specifically, preferably, it is installed at a height where infants as pedestrians can be detected, more preferably at the upper end and rear end of cargo bed 107.

The capturing range of upper camera 5 includes road surface 109 behind truck 100 as with the capturing range R1 illustrated in FIGS. 3A and 3B. The field angle and optical axis A1 of upper camera 5 are set such that the capturing range R1 can be captured. It should be noted that regarding upper camera 5, it is preferable that the rear end of cargo bed 107 fall inside the capturing range R1. The reason for this is that the distance between the detected object and the rear end of cargo bed 107 in the captured image is easily determined.

Figure 4B:
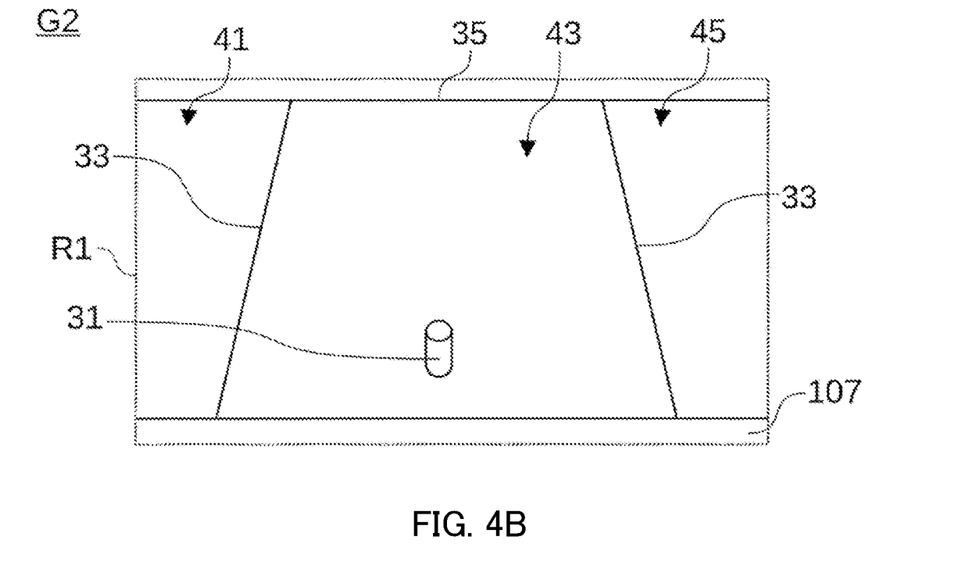
FIG. 4B is a schematic view of an upper camera image, which is an image of a rear side of the vehicle captured with an upper camera.

For example, as illustrated in FIGS. 3A and 3B, upper camera image G2, which is an image captured by upper camera 5 in the case where truck 100 moves backward in the X1 direction in order to park in parking region 43 is schematically illustrated as in FIG. 4B. As illustrated in FIG. 4B, upper camera image G2 captured by upper camera 5 shows at least the rear end of cargo bed 107, white lines 33 and 35, and pillar 31. Also in upper camera image G2, the rear portion of pillar 31 is not shown by being hidden by pillar 31. It should be noted that since upper camera image G2 is captured from the upper side than the lower camera 3, the portion that is hidden by pillar 31 is smaller than the portion that is hidden by pillar 31 of lower camera image G1 captured by lower camera 3 illustrated in FIG. 4A.

Monitoring control unit 13 illustrated in FIG. 2 is a computer that detects an object from lower camera image G1 and upper camera image G2 of the rear side of truck 100 captured by lower camera 3 and upper camera 5. Monitoring control unit 13 is also a computer that makes the driver recognize the possibility of collision in the case where there is a possibility of collision of truck 100 with the detected object, and is provided in cab 105, for example. As illustrated in FIG. 2, monitoring control unit 13 includes conversion unit 15, object detection unit 17, and collision possibility determination unit 19.

Conversion unit 15 is a part that converts lower camera image G1 of road surface 109 captured by lower camera 3 into lower bird's-eye view T1, which is a plan view of road surface 109 as viewed from above. Conversion unit 15 is a part that converts upper camera image G2 of road surface 109 captured by upper camera 5 into upper bird's-eye view T2, which is a plan view of road surface 109 as viewed from above. It suffices that the virtual perspective for generating lower bird's-eye view T1 and upper bird's-eye view T2 is the upper side at the center in the capturing range R1. In addition, publicly known image processing techniques may be used for the means for generating the bird's-eye view. In addition, while conversion unit 15 is included in the configuration of monitoring control unit 13 in FIG. 2, lower camera 3 and upper camera 5 themselves may include conversion unit 15. Further, in the case where truck 100 includes an apparatus for displaying bird's-eye views such as an around-view monitor, the apparatus that generates the bird's-eye view to be displayed on the around-view monitor may be used also as conversion unit 15.

Figure 5A:
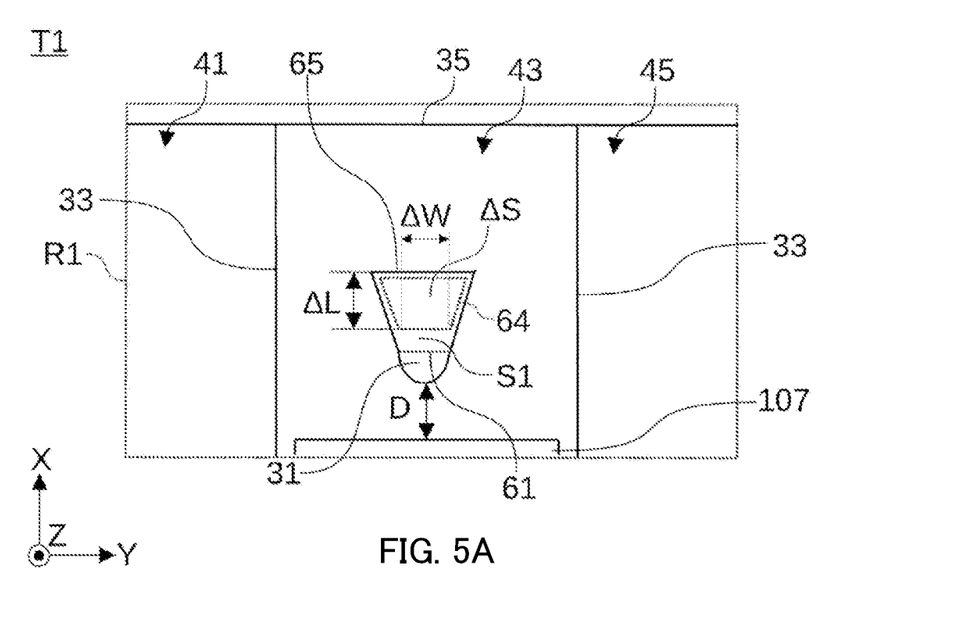
FIG. 5A is a schematic view of a lower bird's-eye view converted from the lower camera image of FIG. 4A.
Figure 5B:
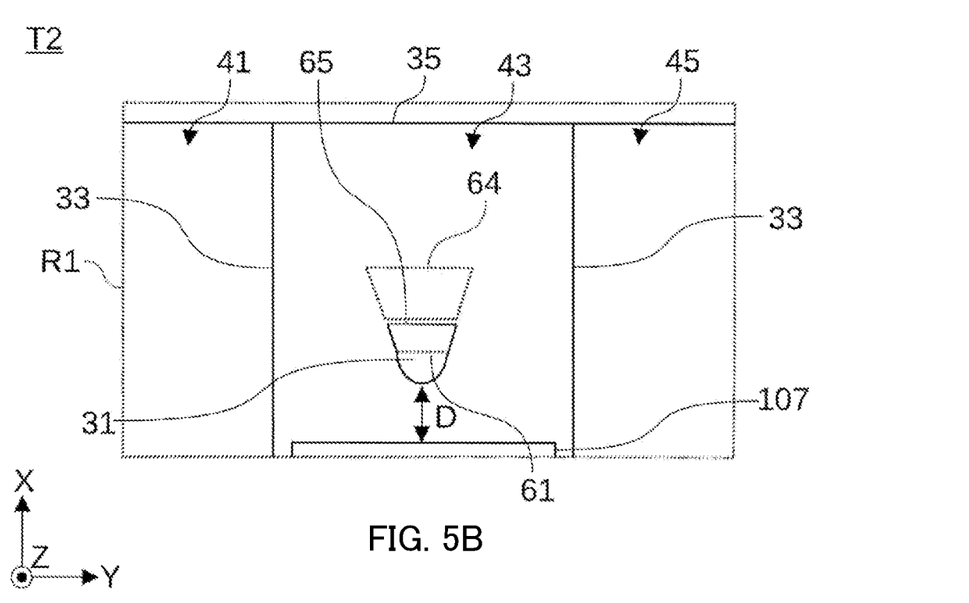
FIG. 5B is a schematic view of an upper bird's-eye view converted from the upper camera image of FIG. 4B.

FIG. 5A is a schematic view illustrating lower bird's-eye view T1 converted from lower camera image G1 on the rear side of truck 100 captured by lower camera 3 illustrated in FIG. 4A. FIG. 5B is a schematic view illustrating upper bird's-eye view T2 converted from upper camera image G2 on the rear side of truck 100 captured by upper camera 5 illustrated in FIG. 4B.

As illustrated in FIGS. 5A and 5B, objects with no height such as white lines 33 and 35 do not have a difference in the actual shape between lower bird's-eye view T1 and upper bird's-eye view T2. In addition, the displayed white lines 33 and 35 do not have a difference in shape and dimension between lower bird's-eye view T1 and upper bird's-eye view T2. On the other hand, an object with a height such as pillar 31 has a large difference in the shown shape and the actual shape between lower bird's-eye view T1 and upper bird's-eye view T2. In addition, the displayed shape and dimension are largely different from each other also in the comparison between lower bird's-eye view T1 and upper bird's-eye view T2. More specifically, the rear side of the portion that is unshown by being hidden by pillar 31 in lower camera image G1 and upper camera image G2 is image-corrected into the same one as pillar 31. Since pillar 31 is located at approximately the center in the vehicle width direction of truck 100, the rear side of the portion that is unshown by being hidden by pillar 31 in lower camera image G1 and upper camera image G2 is image-corrected into trapezoidal corrected part 65. Regarding the size of corrected part 65, the upper bird's-eye view T2 illustrated in FIG. 5B is smaller than lower bird's-eye view T1 illustrated in FIG. 5A. The reason for this is that since upper bird's-eye view T2 is a bird's-eye view converted from upper camera image G2 of road surface 109 captured by upper camera 5, the portion hidden in rear of pillar 31 is smaller than in lower camera image G1.

Object detection unit 17 illustrated in FIG. 2 detects pillar 31 of road surface 109 from difference 64 of corrected part 65 hidden and unshown by pillar 31 of road surface 109 in lower camera image G1 and upper camera image G2 by comparing upper bird's-eye view T2 and lower bird's-eye view T1. More specifically, it detects from difference 64 the position, height, and width in the vehicle width direction of pillar 31 as an object. Specific means for detection can be exemplified as follows.

First, the portions with different appearances in the comparison between upper bird's-eye view T2 and lower bird's-eye view T1, or more specifically, difference 64 of corrected part 65 of upper bird's-eye view T2 and lower bird's-eye view T1 illustrated in FIGS. 5A and 5B is extracted. This portion is the rear side of the portion where the object is present.

Next, the plan position of an object can be detected from the position of difference 64 by comparing upper bird's-eye view T2 and lower bird's-eye view T1. More specifically, difference 64 illustrated in FIG. 5A is located on the rear side of pillar 31, and therefore there is a correlation between the position of difference 64 and the actual position of pillar 31. Therefore, as this the correlation, object detection unit 17 may be configured to have a correlation determined in advance through an experiment as difference correlation information 17a as illustrated in FIG. 2, and the position of pillar 31 may be determined by applying the position of difference 64 to difference correlation information 17a. Note that the correlation between the position of difference 64 and the actual position of pillar 31 may be determined by calculation, not an experiment. In addition, difference 64 is a part of corrected part 65, and corrected part 65 is a portion image-corrected as the same one as pillar 31. Therefore, front end 61 of corrected part 65 may be detected as the center position of pillar 31. When the position of pillar 31 can be detected, distance D between the rear end of cab 105 of truck 100 and pillar 31 can be detected from upper bird's-eye view T2 and lower bird's-eye view T1.

Next, the following two means can be exemplified as the means for detecting the height of pillar 31. A first example may be a means for detecting the height of the object from length ΔL of difference 64 in the front-rear direction by comparing upper bird's-eye view T2 and lower bird's-eye view T1. The reason for this is that length ΔL increases as the height of pillar 31 increases, and therefore there is a correlation between length ΔL and the height of pillar 31. Such a correlation between length ΔL of difference 64 and the actual height of the object may be determined in advance through an experiment and provided as difference correlation information 17a in object detection unit 17 as illustrated in FIG. 2. In this case, object detection unit 17 detects the height of the object by determining length ΔL of difference 64 and applying the determined value to difference correlation information 17a. In addition, the correlation between length ΔL and the height of pillar 31 may not be a value obtained through an experiment, but may be obtained through calculation.

Another example of the means for detecting the height of pillar 31 may be a means for detecting the height of the object from area ΔS of difference 64 of corrected part 65 by comparing upper bird's-eye view T2 and lower bird's-eye view T1. The reason for this is that area ΔS increases as the height of pillar 31 increases, and therefore there is a correlation between area ΔS and the height of pillar 31. This correlation may be determined through experiment and provided as difference correlation information 17a in object detection unit 17, or may be obtained through calculation.

Area ΔS or length ΔL of difference 64 to be used may be selected as necessary in consideration of advantages. For example, the means for detecting the height of the object from length ΔL of difference 64 has a stronger correlation with the height of the object in comparison with the means for detecting the height of the object from area ΔS of difference 64, and therefore advantageous in detection accuracy. On the other hand, the means for detecting area ΔS of difference 64 need not set the reference point for determining the length, and therefore advantageous in ease of the process of calculating area ΔS in comparison with the means for calculating the height of the object length ΔL.

Next, the following two means can be exemplified as the means for detecting the width of pillar 31. A first example may be a means for detecting the width of the object from the width of difference 64 in the vehicle width direction by comparing upper bird's-eye view T2 and lower bird's-eye view T1. For example, shortest width ΔW in the Y direction of difference 64 of corrected part 65 of lower bird's-eye view T1 illustrated in FIG. 5A is detected. The reason for this is that shortest width ΔW increases as the width of pillar 31 increases, and therefore there is a correlation between shortest width ΔW and the width of pillar 31. The correlation between shortest width ΔW of difference 64 and the actual width of the object may be determined in advance through an experiment and provided as difference correlation information 17a illustrated in FIG. 2 in object detection unit 17, or may be obtained through calculation.

Another example of the means for detecting the width of pillar 31 may be a means for detecting the width of the object from area ΔS of difference 64 of corrected part 65. For example, the width of pillar 31 is detected from area ΔS of difference 64 of corrected part 65 of lower bird's-eye view T1 illustrated in FIG. 5A. The reason for this is that area ΔS increases as the width of pillar 31 increases, and therefore there is a correlation between area ΔS and the width of pillar 31. This correlation may be determined through experiment and provided as difference correlation information 17a in object detection unit 17, or may be obtained through calculation.

Collision possibility determination unit 19 illustrated in FIG. 2 is an apparatus that determines the possibility of collision of truck 100 with the object detected by object detection unit 17, and makes the driver of truck 100 recognize the possibility of the collision when it is determined that there is a possibility of collision. As a means for making the driver of truck 100 recognize the possibility of the collision, the possibility of collision may be notified with sound by providing cab 105 with speaker 25 as illustrated in FIG. 2. In addition, the possibility of collision may be notified with letters on display unit 23 by providing display unit 23 such as a liquid crystal display unit for displaying letters and diagrams in cab 105. In particular, in the case where an around-view monitor is provided in cab 105 of truck 100, the possibility of collision may be notified by using the around-view monitor as display unit 23 and emphasizing the detected object in the image displayed on the around-view monitor.

In this manner, rearward monitoring system 1 determines the possibility of collision with the vehicle by comparing the bird's-eye views generated from the camera image captured by lower camera 3 and upper camera 5, and detecting the object from difference 64 of the unshown portion that is hidden by the object in the camera image. Thus, rearward monitoring system 1 can easily determine the possibility of collision of truck 100 with the object behind truck 100 from the image captured by the monocular camera. In particular, in the case where truck 100 includes an apparatus for displaying bird's-eye views such as an around-view monitor, the apparatus for generating the bird's-eye view to be displayed on the around-view monitor can be used also as conversion unit 15. Thus, the possibility of collision of truck 100 with the object behind truck 100 can be easily determined without additionally providing software and an apparatus for image processing.

An example of specific criterion for collision possibility determination unit 19 to determine that there is a possibility of collision may be a case where distance D between the rear end of truck 100 and the object detected by object detection unit 17, such as pillar 31 in FIG. 3, becomes a predetermined distance or smaller. The predetermined distance is a value obtained by multiplying, by a preliminarily set safe rate, the distance that truck 100 will stop before colliding with pillar 31 if the driver steps on the brake, i.e., braking distance.

In this manner, by determining that there is a possibility of collision when distance D between pillar 31 and the rear end of truck 100 becomes the predetermined distance or smaller, the collision with pillar 31 can be avoided by applying the brake at the time when the driver recognizes the possibility of collision.

Note that the predetermined distance serving as the criterion for collision possibility determination unit 19 to determine the possibility of collision may differ depending on the travelling direction and the relative speed of truck 100 and the object. For example, in the case where the object is not a fixture such as pillar 31, but is a moving object such as a pedestrian and the pedestrian walks toward the vehicle, the predetermined distance is shorter than in the case where the object is an unmovable fixture such as pillar 31. In addition, in the case where truck 100 is relatively approaching the object, the predetermined distance decreases as the speed of truck 100 and the object increases. Therefore, collision possibility determination unit 19 sets the predetermined distance by acquiring the travelling direction and speed of truck 100 from steering angle sensor 27 and speed sensor 29 provided in truck 100. In addition, bird's-eye views are generated by causing lower camera 3 and upper camera 5 to capture road surface 109 at a predetermined time interval, the object is detected from difference 64, the position of difference 64 and the variation in size are acquired, and the predetermined distance is set by detecting the direction and the travelling speed of the object. More specifically, when truck 100 and the object are relatively moving to approach each other, the faster the relative speed, the shorter the predetermined distance to be set.

In this manner, by setting the predetermined distance by collision possibility determination unit 19 on the basis of the relative speed and travelling direction of truck 100 and the detected object, the possibility of collision between truck 100 and the detected object can be determined with higher accuracy.

In addition, among the detected objects, collision possibility determination unit 19 handles only objects with a predetermined height or greater as objects with a possibility of collision. An example of the predetermined height may be minimum ground height H2, which is the height of the lowest portion of the height of truck 100 from road surface 109 as illustrated in FIG. 3A. The reason for this is that objects with a height smaller than minimum ground height H2, such as pebbles on road surface 109, have only a low possibility of collision with cargo bed 107 of truck 100.

Note that each of conversion unit 15, object detection unit 17, and collision possibility determination unit 19 illustrated in FIG. 2 may be composed of hardware. Alternatively, these functions may be composed of software to be executed by a computer, and a general-purpose computer that executes these functions based on the command of the software. The specific structure of rearward monitoring system 1 is as described above.

Next, a procedure of a rearward monitoring method using rearward monitoring system 1 is briefly described below with reference to FIG. 6. First, monitoring control unit 13 and conversion unit 15 of monitoring control unit 13 illustrated in FIG. 2 issue a command, to lower camera 3 and upper camera 5, for capturing the capturing range R1 of road surface 109 behind truck 100 at a predetermined time interval. Upon receiving the command, lower camera 3 and upper camera 5 capture capturing range R1, and transmit the captured lower camera image G1 and upper camera image G2 to conversion unit 15 (at S1 in FIG. 6, the capturing step).

Figure 6:
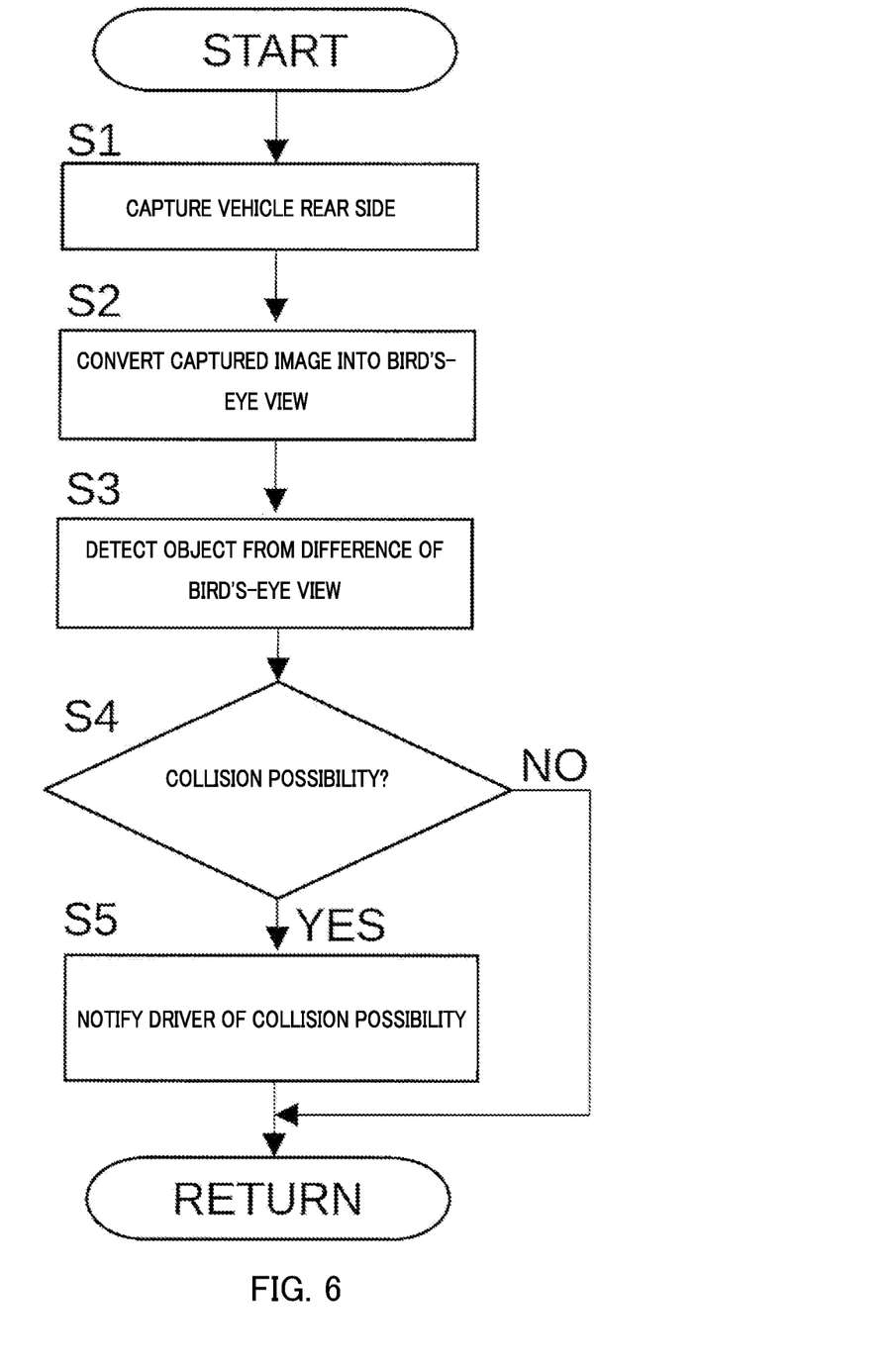
FIG. 6 is a flow chart illustrating a procedure of a rearward monitoring method using the rearward monitoring system according to the present embodiment.

Next, conversion unit 15 illustrated in FIG. 2 converts the acquired lower camera image G1 and upper camera image G2 into lower bird's-eye view T1 and upper bird's-eye view T2 and transmits them to object detection unit 17 (at S2 in FIG. 6, the converting step). Object detection unit 17 compares lower bird's-eye view T1 and upper bird's-eye view T2, and extracts difference 64 of corrected part 65, which is the unshown portion that is hidden by the object on road surface 109 in lower camera image G1 and upper camera image G2. Further, object detection unit 17 detects the object on road surface 109 from difference 64 of corrected part 65, calculates the position, height, width, travelling speed, direction and the like of the detected object, and transmits them to collision possibility determination unit 19 (at S3 in FIG. 6, the object detection step).

Next, collision possibility determination unit 19 illustrated in FIG. 2 determines whether there is a possibility of collision of truck 100 with the object detected by object detection unit 17. When it is determined that there is a possibility of collision, the process proceeds to S5, whereas when it is determined that there is no possibility of collision, the process returns (at S4 in FIG. 6). When it is determined at S4 that there is a possibility of collision with object truck 100, collision possibility determination unit 19 makes the driver of truck 100 recognize the possibility of the collision by using display unit 23 and speaker illustrated in FIG. 2 (at S5 in FIG. 6). Note that S4 and S5 are also referred to as collision possibility determination step. The procedure of the rearward monitoring method using rearward monitoring system 1 is as described above.

As described above, rearward monitoring system 1 according to the present embodiment includes lower camera 3, upper camera 5, conversion unit 15, object detection unit 17, and collision possibility determination unit 19. In this configuration, by comparing the bird's-eye views generated from the camera images of lower camera 3 and upper camera 5, the object is detected from difference 64 of the unshown portion that is hidden by the object in the camera image and the possibility of collision of truck 100 with the object is determined. Thus, it is possible to easily determine the possibility of collision of truck 100 with the object behind truck 100 from the image captured by the monocular camera.

The above description of the present disclosure is based on the embodiments, but the present disclosure is not limited to the embodiments. It is natural for those skilled in the art to come up with various variations and improvements within the scope of the technical concept of the present disclosure, and these are naturally included in the present disclosure.

The invention claimed is:

1. A vehicle rearward monitoring system configured to monitor an object on a road behind the vehicle, the vehicle having a cargo bed, the vehicle rearward monitoring system comprising:
    a lower camera that is a camera provided on a rear end of the cargo bed of the vehicle and configured to capture an image of the road surface behind the vehicle;
    an upper camera that is a monocular camera disposed above the lower camera on the rear end of the cargo bed of the vehicle and configured to capture an image of the road surface behind the vehicle;
    a conversion unit configured to convert a lower camera image into a lower bird's-eye view and convert an upper camera image into an upper bird's-eye view, the lower camera image being the image of the road surface captured by the lower camera, the lower bird's-eye view being a plan view of the road surface as viewed from above, the upper camera image being the image of the road surface captured by the upper camera, the upper bird's-eye view being a plan view of the road surface as viewed from above;
    an object detection unit configured to compare the upper bird's-eye view and the lower bird's-eye view and detect a position of the object on the road surface from a position of a difference of an unshown portion that is hidden by the object located on the road surface in the upper camera image and the lower camera image; and
    a collision possibility determination unit configured to determine a possibility of collision of the vehicle with the object detected by the object detection unit and make a driver of the vehicle recognize a possibility of collision when it is determined that there is a possibility of collision.

2. The vehicle rearward monitoring system according to claim 1, wherein the object detection unit compares the upper bird's-eye view and the lower bird's-eye view and detects a height of the object from a length, in a front-rear direction of the vehicle, of the difference of the unshown portion that is hidden by the object located on the road surface in the upper camera image and the lower camera image.

3. The vehicle rearward monitoring system according to claim 1, wherein the object detection unit compares the upper bird's-eye view and the lower bird's-eye view and the detects a height of the object from an area of the difference of the unshown portion that is hidden by the object located on the road surface in the upper camera image and the lower camera image.

4. The vehicle rearward monitoring system according claim 1, wherein when a distance between the vehicle and the object detected is equal to or smaller than a predetermined distance, the collision possibility determination unit determines that there is the possibility of collision and makes the driver of the vehicle recognize the possibility of the collision.

5. The vehicle rearward monitoring system according to claim 4, wherein the collision possibility determination unit sets the predetermined distance based on a relative speed and a travelling direction of the vehicle and the object.

6. A vehicle rearward monitoring method for monitoring an object on a road behind the vehicle, the vehicle having a cargo bed, the vehicle rearward monitoring method comprising:

capturing an image of a road surface behind the vehicle with a lower camera that is a monocular camera provided on a rear end of the cargo bed of the vehicle and an upper camera that is a monocular camera disposed above the lower camera on the rear end of the cargo bed of the vehicle;

converting a lower camera image into a lower bird's-eye view and converting an upper camera image into an upper bird's-eye view, the lower camera image being the image of the road surface captured by the lower camera, the lower bird's-eye view being a plan view of the road surface as viewed from above, the upper camera image being an image of the road surface captured by the upper camera, the upper bird's-eye view being a plan view of the road surface as viewed from above;

comparing the upper bird's-eye view and the lower bird's-eye view and detecting a position of the object on the road surface from a position of a difference of an unshown portion that is hidden by the object located on the road surface in the upper camera image and the lower camera image; and determining a possibility of collision of the vehicle with the object detected by the comparing and detecting and making a driver of the vehicle recognize a possibility of collision when it is determined that there is a possibility of collision.

* * * * *